(No Model.)
3 Sheets—Sheet 1.
J. P. GILL.
PROCESS OF AND APPARATUS FOR THE TREATMENT OF IRON AND STEEL.
No. 283,999. Patented Aug. 28, 1883.
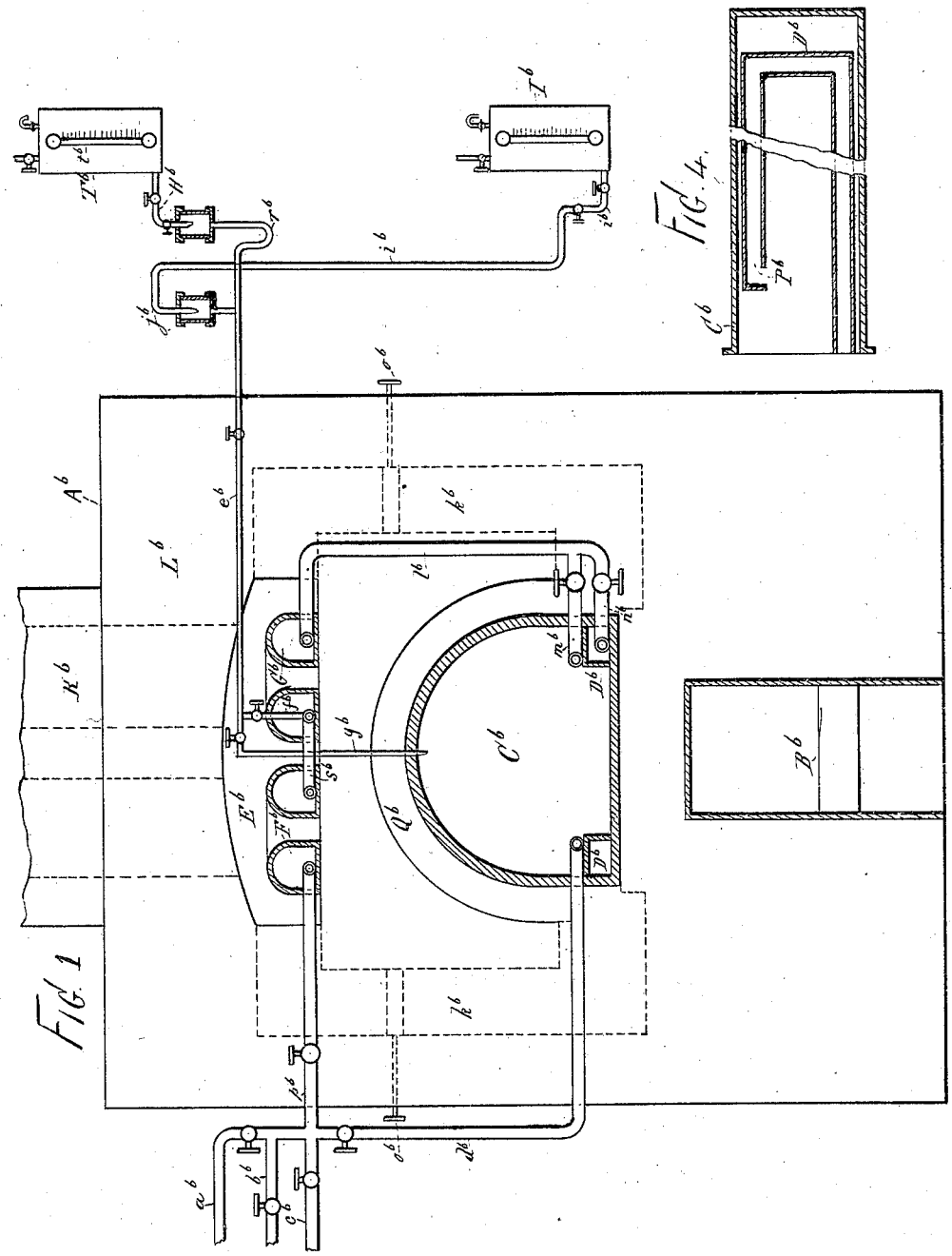

(No Model.)   3 Sheets—Sheet 2.
J. P. GILL.
PROCESS OF AND APPARATUS FOR THE TREATMENT OF IRON AND STEEL
No. 283,999.   Patented Aug. 28, 1883.
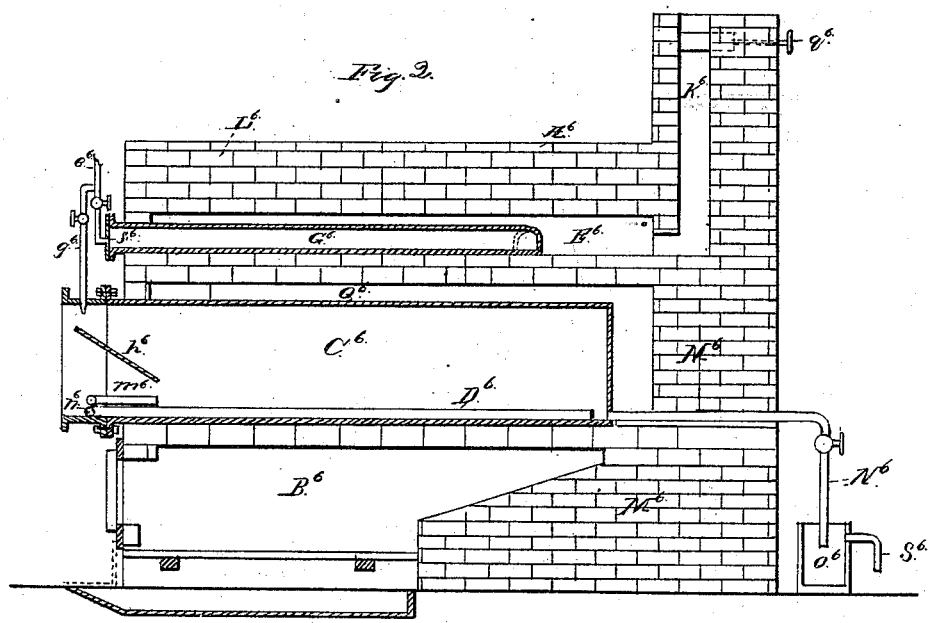

(No Model.) 3 Sheets—Sheet 3.
J. P. GILL.
PROCESS OF AND APPARATUS FOR THE TREATMENT OF IRON AND STEEL.
No. 283,999. Patented Aug. 28, 1883.
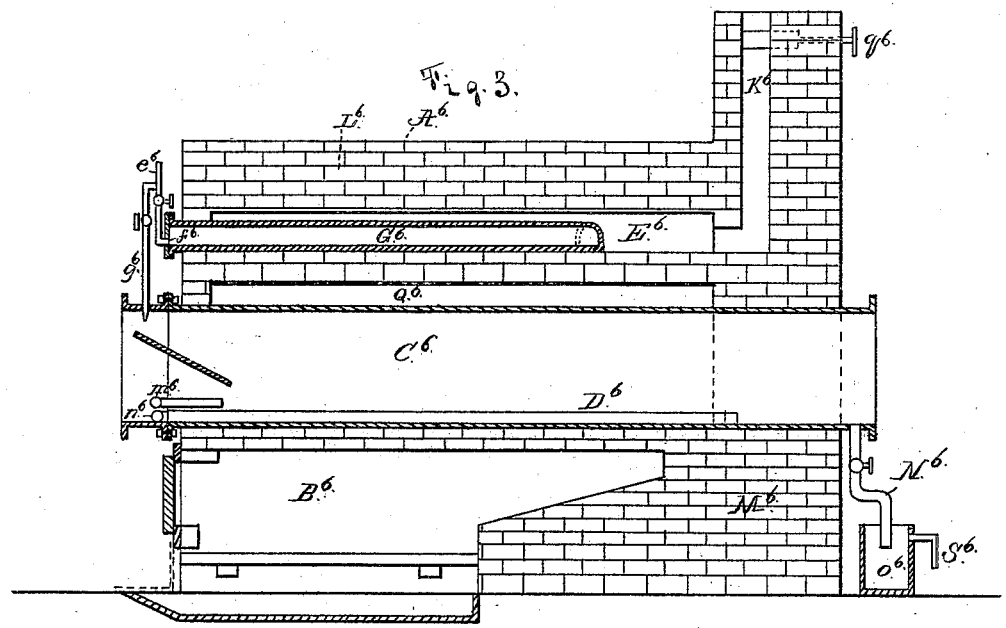
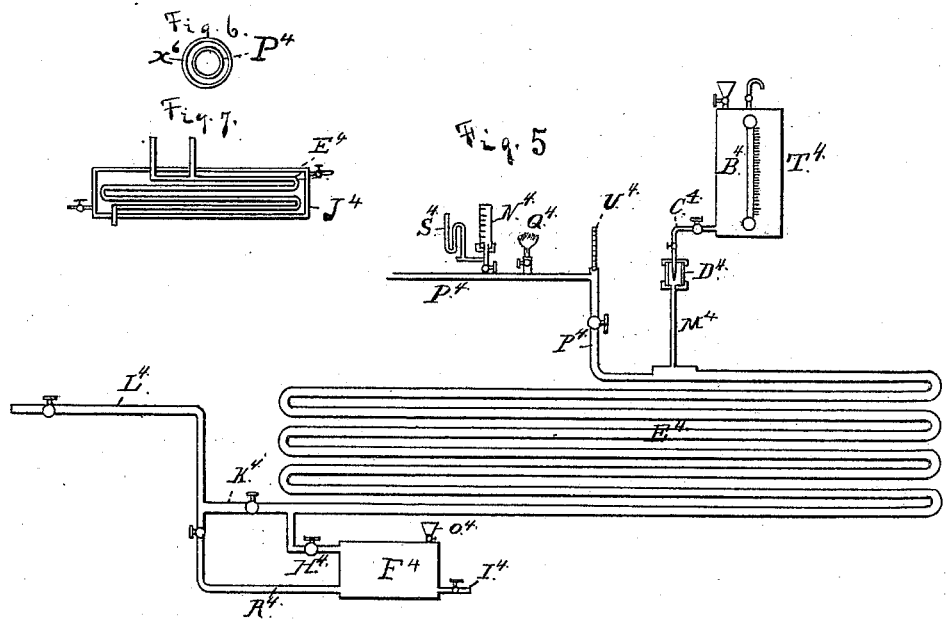
Witnesses
N. A. Clark.
F. L. Middleton
Inventor
Joseph Pearson Gill

UNITED STATES PATENT OFFICE.

JOSEPH PEARSON GILL, OF NEW YORK, N. Y.

PROCESS OF AND APPARATUS FOR THE TREATMENT OF IRON AND STEEL.

SPECIFICATION forming part of Letters Patent No. 283,999, dated August 28, 1883.

Application filed July 9, 1883. (No model.)

*To all whom it may concern:*

Be it known that I, JOSEPH PEARSON GILL, of the city, county, and State of New York, have invented certain new and useful Improvements in Processes of and Apparatus for the Treatment of Iron and Steel; and I do hereby declare that the following is a full, clear, and exact description of the invention, which will enable others skilled in the art to which it pertains to make and use the same, reference being had to the accompanying drawings, and to the letters of reference marked thereon, which form part of this specification.

My invention relates to the treatment of iron and steel and other metals and alloys of metals and manufactures of metals. One of the results produced by my treatment of iron and steel manufactures is the incorporation of the rustless principle into their surfaces, producing a practically non-corrodible surface, capable of resisting the action of the elements, acids, and salt-water, and which withstands rough usage and the hammer-stroke. By this treatment the bulk of the articles is not increased and the quality of the articles is not injured. Iron articles are also toughened and strengthened. The same apparatus and materials are used for the treatment of ores to effect the direct reduction of metal therefrom.

My invention consists in certain improvements in the apparatus and in the mode of treatment of the materials within the apparatus, all as hereinafter fully set forth.

The apparatus is illustrated in the accompanying drawings, in which Figure 1 is a front view of the bench, with the inner wall in section. Figs. 2 and 3 are longitudinal sections. Fig. 4 is a longitudinal section, showing the flues. Fig. 5 is a side view of a vaporizing apparatus. Figs. 6 and 7 represent, respectively, the heating-jacket as applied to the pipe and coil.

For the specific treatment of iron and steel surfaces to render them non-corrosive by the use of superheated steam and hydrocarbon, referred to not only in the present application, but also in the United States Letters Patent Nos. 179,475, 182,456, and 182,457, already granted therefor, I use the following apparatus:

Referring to the drawings, $A^6$ is a furnace containing a retort or retorts or closed chamber or chambers, $C^6$, from which the outside air and the products of combustion are excluded. $B^6$ is the fire-box of the furnace. $Q^6$ is the space or combustion-chamber over the fire-box $B^6$, in which the retort or muffle $C^6$ is placed. $E^6$ is a chamber located above $Q^6$. $F^6$ is a superheater located in the chamber $E^6$. $G^6$ is a vaporizer, also located in the chamber $E^6$. $D^6$ are flues or pipes located in the bottom of the retorts $C^6$, which flues open laterally into the retorts at a point, $P^6$, as in Fig. 4, Sheet 1. $k^6 k^6$ are flues leading from the bottom of the combustion-chamber $Q^6$ to the bottom of the chamber $E^6$. The products of combustion from the fire in the fire-box $B^6$, having passed through the chamber $Q^6$, thereby heating it, pass through the flues $k^6 k^6$ into the upper chamber, $E^6$, and, heating it by passing through it, thence pass out by the uptake or chimney $K^6$ in Fig. 2. $o^6 o^6$ in Fig. 1 are dampers in the flues $k^6 k^6$, for regulating the draft. $q^6 q^6$ in Figs. 2 and 3 are also dampers in the uptake or escape-flue $K^6$. $T^6$ in Fig. 1 is a tank for containing oil or naphtha, with a glass gage and graduated scale, $t^6$. $H^6$ is a pipe with a valve for delivering the oil through the gas-tight glass cylinder into the siphon-pipe $r^6$, thence through the pipe $e^6$ and through the branch pipe $f^6$ into the vaporizer $G^6$, or through the branch-pipe $g^6$ into the retort or muffle $C^6$. In this case the oil or naphtha runs into the vaporizer or retort by gravitation. $I^6$ is a similar oil-tank with a glass gage and graduated scale. $i^6$ is a pipe with valve rising to the gas-tight glass cylinder $j^6$. In this case the oil is forced up by means of the pressure of air to the point $j^6$, from whence it descends by gravitation to and through the pipe $e^6$, and thence to the vaporizer and muffle. $c^6$ is a pipe with automatic regulator-valve and pressure-gage, connected with the steam-generator and with a pipe, $p^6$, and thence with a superheater, $F^6$. $b^6$ is a pipe or pipes with valves for conveying gases from holders or other sources of supply, under automatic regulation, to and through the pipe $p^6$ to the superheater $F^6$. $a^6$ is a pipe with valves for conveying air from a pump or automatically-regulated forcing device and receiver—such as those shown in application of even date herewith, marked "Division B,"—to the superheater $F^6$. $d^6$ is a branch pipe for conveying steam, gas, or air into the retort $c^6$.

When articles are to be treated for the production of a non-corrosive surface, they are to be suspended or laid on suitable supports in the muffle or retort $C^6$. A supporting-frame, if light, may be slid in on bars resting on the bottom of the muffle, or, if heavy, run in on a truck or movable platform on wheels or rollers, or on balls. The iron or steel articles, before being placed in the retort or muffle, are cleaned from external impurities in any suitable manner, by washing, friction, or pickling, as may be required. The articles having been placed in the muffle and brought to a red heat, I admit hydrogen gas through a pipe, as $b^6$, through the superheaters $F^6$ $D^6$ into the muffle $C^6$, which removes from the surface of the iron any remaining or acquired rust and other impurities, thus preparing it for the efficient action of the gases and vapors. The hydrogen being shut off, I then admit, under one process, steam through the pipe $c^6$, superheater $F^6$, vaporizer $G^6$, pipe $e^6$, and branch pipe $m^6$, into the muffle. Through the action of the steam the surface of the iron becomes coated with an oxide in the course of about fifteen minutes. Naphtha or oil is admitted from the tank $T^6$ or $I^6$ through the pipe $e^6$ and the branch pipe $f^6$ into the vaporizer $G^6$, and thence the commingled steam and vapor is conveyed through the pipe $e^6$ and branch pipe $m^6$ into the muffle. The hydrocarbon vapor acting upon the surface of the iron which has become oxidized, combines therewith, forming a homogeneous surface which resists the effects of atmospheric exposure or acid vapors or strong acids. The hardness and durability of the surface varies with the length of the treatment, which may vary to accomplish the result desired from a few minutes to several hours. I also admit the steam and vapor simultaneously into the muffle $C^6$.

A modified treatment is obtained by using the steam and hydrocarbon vapors alternately—that is, using the steam first, then the vapor with the steam shut off, and then repeating the alternate use until the desired surface is obtained; or the steam may be admitted through the branch pipe $n^6$ into the superheating-tube $D^6$ on the bottom of the muffle, and the oil may be admitted through the branch pipe $g^6$ in the top of the muffle and dropping on a sloping pan, as shown in another application, on which it is partly vaporized as it flows along it, and the residuum drops upon the heated floor of the muffle, as near the front as will secure a rapid and perfect evaporation. The action of the superheated steam and hydrocarbon vapor by this latter method is substantially the same as the one hereinbefore described. This method is adapted to heavy work that does not require delicate treatment, and also for the use of heavy oils, including oils containing nitrogen or nitrogenous compounds, as well as mineral and other oils, as the specific treatment may require, and which oils require a higher temperature for their evaporation, and which are more apt to clog up small pipes and vaporizers. These heavy oils I also admit into a dry heated vaporizer through which superheated steam or its equivalent is passing, the temperature of the vaporizer being above that of the boiling-point of the liquid and below that of destructive distillation, for the purpose of properly vaporizing such oils and mixing them with the superheated steam or its equivalent, the said mixture then being conveyed to the retort $C^6$ through the pipe $e^6$ in the manner hereinbefore described. This method produces a homogeneous surface which is non-corrosive, withstands the action of acids, and, being also tough and adhesive, resists concussion and rough usage. Any waste gases from the treatment are conveyed by means of the pipe $N^6$, as in Fig. 2, which leads from the rear and bottom of the muffle into a main or trap, $O^6$, which is filled with water or other liquid up to the level of the escape-pipe $S^6$. The pipe $N$ dips into the liquid sufficiently deep to cause a pressure in the muffle and prevent a too rapid escape of the steam, vapor, or gas.

Fig. 3 shows a longitudinal section of the furnace, in which the muffle $C^6$ extends through the rear wall, $M^6$, of the furnace, and is open at both ends. In this case the pipe $N^6$ is taken out of the bottom of the retort, as shown in the figure. This form of muffle is useful for heavier articles of iron or steel, which can be entered and removed at the rear end. In case of operations where the escape of products through the pipe or pipes $N^6$ is in large quantities, the products may be saved or utilized for heating purposes. I also introduce air through the pipe $a^6$, above referred to, Fig. 1, which, passing though the superheaters $F^6$ and $D^6$, becomes highly heated in the same manner as the steam, and is used for the same purpose—viz., to oxidize the surface of the iron, and, in combination with the hydrocarbon vapors, as above stated, to produce a non-corrosive surface, in a manner similar to that of the steam and hydrocarbon vapors. I use the air, with or without its combination with the steam, simultaneously or alternately with hydrocarbon vapors. I use the air in this connection because the action of the agents in the muffle on the iron takes place in the presence of nitrogen, which is one of the constituents of the air, and is useful in the treatment. I also introduce into the muffle, through the pipe $b^6$, and thence through the superheaters, carbonic-acid gas ($CO_2$,) obtained by the methods described in an application now pending, marked "Division A," or from other sources, for the purpose of oxidizing the surface of the iron by imparting a portion of its oxygen to it, as stated in patents hereinbefore referred to, and subsequently I admit carbonic-oxide gas, (CO,) which, by imparting a portion of its carbon to it, forms a non-corrosive surface similar to that before mentioned. I also use carbonic-acid gas in combination with steam, and carbonic-oxide gas in combination with hydrocarbon vapors, in modification of the foregoing treatment. I also treat the surfaces of iron and steel by the use of the gas produced by means of air, as described in Letters Patent Nos. 275,635 and 275,761, and also as described in an application now pending, and marked "Division A." The surfaces of the iron having been oxidized by means of the superheated steam and carbonic-acid gas, I admit the air-gas charged with hydrocarbons through a pipe, as $b^6$, to the muffle, the gas being alternately applied until the proper surface has been obtained, and I also commingle the air-gas with the superheated steam or carbonic-acid gas in this treatment, the nitrogen contained in the air-gas aiding to produce the result required.

In the treatment of iron and steel I employ a vaporizer, a heating-jacket, and a regulated supply-tank, substantially as hereinafter described, viz:

Referring to Fig. 5, $T^4$ is a tank or receiver for holding the hydrocarbon liquid. $B^4$ is a glass gage and graduated scale for exhibiting the quantity of liquid used. $C^4$ is a valve for regulating the flow of the liquid. $D^4$ is a gas-tight glass cylinder for the purpose of exposing the flow to view. $N^4$ is a pipe for conveying the liquid to the top of a coil, $E^4$, which must be of sufficient diameter and length to evaporate all the liquid that is allowed to flow into it. $F^4$ is a drip-box for the purpose of receiving any accidental overflow of liquid. $I^4$ is an outlet and valve for drawing off the overflow when required. $L^4$ is a pipe for conveying gas or air to the coil $E^4$. $K^4$ is a branch pipe and valve connecting the pipe $L^4$ with the bottom of the coil $E^4$. $R^4$ is a branch pipe and valve connecting the pipe $L^4$ with the drip-box $F^4$. $H^4$ is a pipe and valve connecting the drip-box with the bottom of the coil. $P^4$ is a pipe for conveying the commingled hydrocarbon vapor and gas or air to the point of combustion or use. $N^4$ is a jet-photometer. $S^4$ is a pressure-gage, and $Q^4$ is a burner for ascertaining the proportion of the hydrocarbon vapor in the commingled gas or air and vapor. Gas or air being admitted to the coil $E^4$ through the pipe $L^4$ and branch pipe $K^4$, or to the drip-box through the branch pipe $R^4$, if desired, the liquid is allowed to flow from the tank $T^4$ through the valve $C^4$ in the proportion required, as indicated by the graduated scale $B^4$, burner $Q^4$, and jet-photometer $N^4$. By opening or closing the valves $C^4$, and by means of the graduated scale and jet-photometer, any desired proportionate quantity of the hydrocarbon vapor can be obtained and regulated. In case the boiling-point of the liquid used should be too great for natural evaporation, I inclose the vaporizing-coil in a steam jacket or case, as $J^4$ in Fig. 7, and also the discharge-pipe $P^4$ in a steam-pipe, $X^6$, in Fig. 6, which is connected with the jacket inclosing the coil. Steam, being allowed to circulate therein, assists in maintaining the temperature requisite for the vaporization of the liquid. $U^4$ is a thermometer for ascertaining the temperature of the vapor. By means of this vaporizer gases of low illuminating-power—such as hydrogen, carbonic-oxide, or air-gas, or air—take up, on passing through the coil $E^4$, such amount of hydrocarbon liquid as is admitted into it from the tank $T^4$. The commingled gases and vapors then pass through the pipe $P^4$, Fig. 5, and thence by pipe, as $b^6$, Fig. 1, to the superheater and muffle. Thus I vary the amount of carbon used and the consequent treatment of the iron or steel in such manner as to meet the requirements of the special article under treatment. These combined gases and vapors may pass through the superheater and vaporizer, and thence into the muffle $C^6$; or they may pass by means of the branch pipe $d^6$ direct to the muffle.

The action of the nitrogen or nitrogenous oils, to which reference has heretofore been made, is to impart to the iron or steel an improved non-corrosive surface. It will be understood that the use of the nitrogen or nitrogenous oils is not always required; but its employment in the treatment of certain articles for specific uses is necessary in order to give the particular surface required. The nitrogen or nitrogenous oil may also be used as a preliminary treatment in certain cases, to prepare the articles for final treatment, which is to give them a surface capable of resisting acids or other corrosive substances.

In case the articles of iron and steel requiring treatment are not sufficiently pure or in perfect condition to fully benefit by the treatment, as hereinbefore described, I use the methods set forth in United States Letters Patent Nos. 182,456 and 182,457, whereby any deteriorated or imperfect articles are restored to a serviceable condition as a preparation for said treatment.

As a special application of the methods above referred to for the restoration and treatment of articles of iron, I use apparatus similar to that shown in Fig. 1, as hereinbefore described, under the following treatment: The articles of iron having been placed in the muffle $C^6$, and having been brought to a low red heat, omitting the steam, I admit oil from the tank $T^6$ or $I^6$, through the branch pipe $g^6$, into the top of the muffle, as hereinbefore shown. At the same time I introduce nitrogen through the pipe $b^6$ and branch pipe $d^6$ into the bottom of the muffle, by which means the hydrocarbon vapor acts upon the iron in the presence of nitrogen; or, in lieu of pure nitrogen, I admit, through the pipes $b^6$ and $d^6$, into the muffle air-gas produced in the manner hereinbefore described, and of low illuminating-power, which, being without free oxygen, operates in the same manner as the pure nitrogen; or in some cases I use the air-gas alone, charged with a proper quantity of hydrocarbon. One of the effects produced by the foregoing treatment is the conversion of an old deteriorated crystallized wrought-iron into a fibrous iron, giving it greater strength and ductility. The article thus produced differs, both in appearance and in quality, from any heretofore produced, so far as I am aware.

This complete product may be given a non-corrosive surface, if desired, by means of the processes hereinbefore described.

I use in the treatment of iron surfaces a closed muffle, from which the products of combustion are excluded, in preference to an open hearth or chamber, for the reason that I can conduct the operations with greater accuracy and with greater certainty of result. The articles treated in said muffle for the production of non-corrosive surfaces vary in color after treatment, from a light purple to dark shades, or black. In order to modify the color, I withdraw the articles, while hot, from the muffle and plunge them in a bath of oil, in which they are allowed to cool. A black color may thus be obtained which is capable of a brilliant polish. This bath also has a tendency in some cases—as, for instance, when steel is treated—to improve the temper of the articles treated. Any oil or tempering compound may be used; but in many cases oils containing nitrogen or nitrogen and carbon compounds are preferable. The joint action of the carbon and oxygen on the article treated produces a change in the metal from the surface inward, the amount of change in the material being greatest at the surface and gradually diminishing toward the center. This leaves the texture or fiber homogeneous and continuous, in contradistinction to a surface composed of film or scale. The surface is formed in the material itself, and not upon it.

It will be understood from what has been heretofore stated that air and carbonic-acid gas may be used, in whole or in part, in the place of steam, and are included as equivalents in this respect in the process described; also that carbonic-oxide gas, carbureted-hydrogen gas, and fixed air-gas may be used for the hydrocarbon vapors without departing from the spirit of my invention.

I am aware that it is not new to treat iron and steel with carbonic acid mixed with carbonic oxide or watery vapors, as products of combustion in open vessels; that oil and deoxidized air have been introduced into closed vessels with such articles in uncontrolled quantities, and I do not therefore claim, broadly, treating articles of iron or steel with gases; nor do I claim, broadly, a non-corrodible surface on such articles.

I do not herein claim the non-corrodible article, as that is the subject of a separate application.

Having thus described my invention, I claim—

1. A furnace containing a closed retort or chamber within the combustion-space, but not communicating therewith, a chamber located preferably above, containing a superheater and vaporizer, flues from the lower to the upper chamber, whereby the products of combustion are transmitted, supply-tanks for the hydrocarbon, and pipes for steam, air, and gas from suitable sources, the parts being combined substantially as described and set forth.

2. The process of treating iron or steel in a closed chamber with or without pressure, consisting in introducing steam and hydrocarbon vapor in automatically-regulated quantities, simultaneously or in succession, to the iron or steel articles in said chambers, substantially as described, and for the purpose set forth.

3. In combination with the described closed chamber for treating iron and steel, a discharge-pipe, $N^6$, for the gases or vapors, and a trap, $O^6$, to regulate the flow of the gases or vapors, and to maintain the pressure in the chamber, all substantially in the manner herein described and set forth.

4. In combination with a closed chamber for the treatment of iron or steel, a coil, $E^4$, a supply-pipe, $L^4$, for the gas or air, a drip-box, $F^4$, and pipes connecting to the coil, a tank for the oil, and stop-cock, a jet-photometer, a burner and pressure-gage, and pipe $P^4$ for connection with the chamber, whereby the amount of hydrocarbon may be varied, all constructed, connected, and operated substantially in the manner herein described, and for the purpose set forth.

5. The process of treating iron or steel in a closed chamber by subjecting the iron or steel to the action of hydrocarbon vapor and nitrogen supplied, independently or together, in regulated quantities, substantially as described, and for the purpose set forth.

6. The process of treating iron or steel in order to give it a non-corrodible surface, consisting in subjecting them to the vapor of nitrogenous oils in a closed chamber at a low red heat and then treating them in a closed chamber in the presence of heat with hydrocarbon vapor and an oxidizing agent, substantially as described.

7. The process of treating iron or steel, consisting in first oxidizing the said iron or steel and then submitting them to the action of a regulated supply of hydrocarbon vapor in a closed chamber, as set forth.

In testimony that I claim the foregoing as my own I affix my signature in presence of two witnesses.

JOS. PEARSON GILL.

Witnesses:
ARTHUR VAN HOESEN,
CHAS. G. HANKS.